No. 742,420. PATENTED OCT. 27, 1903.
G. H. HARVEY.
GLASS DRAWING MACHINE.
APPLICATION FILED APR. 20, 1903.
NO MODEL.
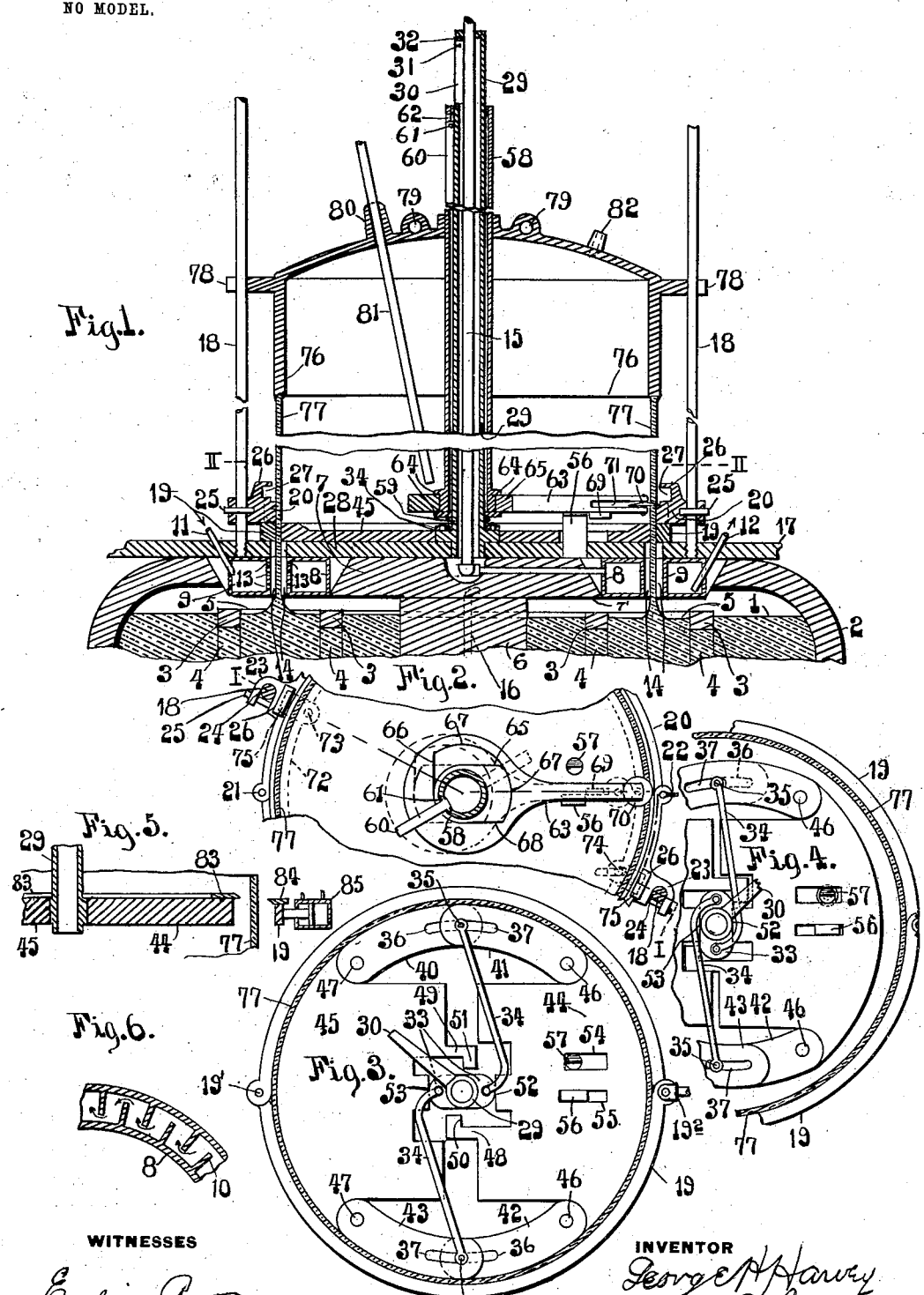
WITNESSES
INVENTOR
George H Harvey
by Edward A Lawrence
his attorney No. 742,420. Patented October 27, 1903.

UNITED STATES PATENT OFFICE.

GEORGE H. HARVEY, OF GLENFIELD, PENNSYLVANIA, ASSIGNOR TO J. HARVEY HARRISON, OF PITTSBURG, PENNSYLVANIA.

GLASS-DRAWING MACHINE.

SPECIFICATION forming part of Letters Patent No. 742,420, dated October 27, 1903.

Application filed April 20, 1903. Serial No. 153,345. (No model.)

*To all whom it may concern:*

Be it known that I, GEORGE H. HARVEY, a citizen of the United States of America, and a resident of Glenfield borough, county of Allegheny, and State of Pennsylvania, have invented certain new and useful Improvements in Glass-Drawing Machines, of which the following is a specification.

In the accompanying drawings, Figure 1 is a vertical section along the line I I in Fig. 2, showing also the tank or receptacle for the glass and additional parts hereinafter to be described. Fig. 2 is a broken plan view, partly in section, along the line II II in Fig. 1, the inner supporting device and vertical tubes being omitted for the sake of clearness. Fig. 3 is a like view showing, however, the inner supporting device in clamping position, the shearing mechanism being omitted for the sake of clearness. Fig. 4 is a similar view showing the supporting device in its relaxed position. Fig. 5 is a vertical section showing a second form of shearing or cutting means; and Fig. 6 is a horizontal section of one of the coolers, showing a novel means of equalizing the temperature thereof.

The purposes of my invention, generally stated, are to increase the output of glass-drawing machines by reducing the cost of and labor required in manufacture and perfecting the quality of the product. I also provide means for the continuous drawing of the sheet, thus avoiding dead ends and the delay of reheating the same. I also provide novel means for equalizing the temperature maintained at the apex of the draw—that is, at the summit of the annular taper of the molten glass at the point where it forms into a cylinder.

I attain the above results preferably as follows, reference being had to the drawings, which are, however, merely illustrative of the general principles of my invention.

Glass 1 in a liquid or semiliquid state is contained in a receptacle 2, which receptacle may be of any desired design—as, for instance, it may be a part of the general glass pot or tank or auxiliary thereto or independent thereof without departing from my invention.

3 represents refining-rings having therein a series of openings or ports 4, which permit of the passage of the glass from receptacle 2 into the refining-ring 3 below the surface of the glass, so that all scum or impurities are thereby excluded from the refining-ring.

6 is a central supporting-column whereon is mounted block 7 in the opening 7' of the receptacle 2.

8 is the inner cooler, (shown circular in the drawings,) affecting the inner surface of the cylinder of glass as it is drawn, said cooler being preferably attached to block 7, while 9 is the outer cooler, affecting the exterior surface of the glass and surrounding the same circumferentially, said outer cooler being preferably supported in the crown of the receptacle 2. 10, Fig. 6, represents baffles in the interior of said coolers, whose office is to deflect the current of cooling medium, and thereby equalize the temperature of the cooler.

11 is the inlet-pipe for the admission of the cooling medium to cooler 9 at any convenient point, and 12 the outlet, so placed as to maintain a current through the cooler. In case air or similar fluid cooling medium be used in coolers 8 and 9 I provide for each cooler a series of ports 13, through which the cooling medium may be allowed to escape against the inner and outer surfaces of the draw of glass. In such cases outlets, such as 12, would not be required. Coolers 8 and 9 are so spaced as to leave an orifice 14 between them. Cooler 8 receives its circulating medium through pipe 15, which may enter the cooler, as shown, or at any convenient point, and the outlet-pipe 16 for use when a liquid medium is resorted to may be led down through column 6 and connected to cooler 8 at any point serving to promote the circulation of the medium.

17 represents a table located above the receptacle 2 and upon which are mounted the vertical guides 18, also outer portion of supporter-clamp 19, which clamp is composed of two members hinged at 19' and capable of being locked together at 19².

20 is a clamp mounted on clamp 19 and composed of two portions hinged at 21 and capable of being locked together at 22. It also has lugs 23, which lugs are provided with slots 24, which slots engage the guides 18 and are locked by pins 25. Lugs 26 are recessed at 27 for the purposes described below.

28 represents a central support to which is rotatably secured tubular upright 29, which upright is provided with drop-handle 30, which in turn is supported on trunnions 31 and swings in and out of slot 32, so that when not in use it is flush with the surface of upright 29. 33 represents cams rigidly secured to said upright 29 near its lower extremity and to which rods 34 are pivotally secured. The rods 34 are pivoted at their outer extremities to pins 35, said pins 35 being in turn loosely mounted in slots 36 and 37 of the auxiliary clamps 40, 41, 42, and 43. Said auxiliary clamps are pivotally secured at their outer extremities to clamps 44 and 45 by means of pins 46 and 47.

48 and 49 are lugs on clamps 44 and 45, having shoulders 50 and 51. 52 and 53 are likewise projections on clamps 44 and 45.

54 and 55 are slots in clamps 44 and 45, through which rigid lug 56 and spring-pin 57 project, said lug and said pin being mounted in the central support 28.

Located above the clamps 44 and 45 and surrounding tubular upright 29 for a portion of its length is a second tubular upright 58, which is loosely supported on collar 59 of the tubular upright 29. A drop-handle 60 is secured by trunnion 61 to the upper part of tube 58 and is capable of being swung into slot 62 of said tube so as to be flush therewith when in its inoperative position.

63 is a cutter or shearing device removably secured in ways 64 of the outer tube 58 and is operated by cam 65, rigidly secured to said outer tube, pressing on the face 66 of a recess in the body portion of said cutter, in which said cam 65 turns, to cause said cutter to retreat into the position indicated by the dotted line in Fig. 2, next pressing on the segmental circular face 67 of said recess to advance said cutter into the position shown by full lines in said Fig. 2, when the cutting device of said cutter will impinge against the inner surface of the tube of glass and against the face 68 of said recess to revolve said cutter.

69 is a downwardly-projecting lug on the under side of cutter 63, which when said cutter is in the position shown in dotted lines in Fig. 2 abuts against rigid lug 56, which, as explained, is mounted on support 28 and extends upwardly through a slot in clamp 44 in the direction of rotation of said cutter, thus preventing said cutter from rotating with the cam 65 when said cutter is being forced outwardly against the glass into the position indicated by the full lines in Fig. 2. When said cutter has assumed the position shown in said full lines, said lug 69 has passed beyond lug 56, thus permitting the rotation of the cutter by means of cam 65.

The cutter 63 preferably carries a cutter-wheel 70, which is mounted in the slotted way 71 of the cutter.

In Fig. 2 I have shown in dotted lines a clamp 72, composed of two members hinged together at 73 and capable of being locked together, as at 74. Said clamp is provided with outwardly-extending flanges 75, which are adapted to engage recesses 27 of lugs 26.

Slidably supported on outer tube 58 is the gatherer 76, shown in Fig. 1 as having attached to its gathering extremity a tubular draw of glass 77. Slotted projections 78 engage guides 18, thus preventing torsional motion in the glass being drawn. Eye-holes 79 provide means for inserting suitable toggle or other mechanism for raising or lowering the gatherer.

80 is an inlet-orifice through which may be passed an extensible tube 81 for the passage of a cooling fluid, said tube being capable of passing downwardly into the interior of the draw of glass 77 to discharge therein. 82 is an escape for the excess.

Referring to Fig. 5, 83 represents shear-blades, and, as therein shown, are attached to the clamps 44 and 45 and the auxiliary clamps 40, 41, 42, and 43, said blades so projecting beyond the clamping-surfaces of said clamps as to operate independently thereof, and thereby forming a continuous peripheral shearing edge. It is evident that in such case the clamping-surfaces are not required, but that a like mechanism to that used to advance said clamps into position may also be used to advance said shearing device into operative place. A similar blade 84 may be attached to the outer support or clamp 19, which clamp or support in addition to being constructed in two hinged portions may have its free ends controlled by a hydraulic ram 85 or similar means.

The general operation of the machine is as follows: Assuming in Fig. 1 that the cutter 63 is in its position of withdrawal, as shown in dotted lines in Fig. 2, clamp 20 open, clamp 19 open, and clamps 44 and 45 and their auxiliary clamps 40, 41, 42, and 43 withdrawn inwardly, as shown in Fig. 4, a clear passage through orifice 14 into the receptacle 2 would exist, through which the operator lowers the gatherer 76 until its lower extremity enters the glass 1 contained within refining-rings 3 in receptacle 2, such glass being of proper consistency for drawing into sheet form. After remaining a sufficient length of time to cause the glass to adhere to it the gatherer is raised at the speed best suited to cause the adhering glass to be drawn through the zone of lower temperature maintained between the coolers 8 and 9. As the gatherer continues to rise the air in the interior of the cylinder of glass which follows up after the gatherer becomes highly heated and expands, but as the volume increases the pressure decreases. Therefore to prevent the cylinder from collapsing on account of the greater atmospheric pressure without I admit a cooling fluid, either through pipe 15, as below described, or through the extensible tube 81, which preferably discharges at or near the bottom of the cylinder of glass above the table, thus forming a circulation of the cooling medium through the interior of the cylinder and out by escape 82. By this means I equalize the interior pressure with the exterior atmospheric pressure and cause both walls of the cylinder to be subjected to no unequal strain. After the gatherer has reached the desired height preferably the outer clamp 20 is closed, and the operator raises drop-handle 60 to its horizontal operative position and rotates the same in the proper direction, thereby also rotating tube 58. The rotation of tube 58 will also rotate cam 65 from the dotted position shown in Fig. 2 to the position shown in full lines in said figure, thus causing cutter-wheel 70 to cut through the wall of the glass tube 77, and by the continued rotation of handle 60 and the consequent rotation of cutter 63 said cutter-wheel 70 will be caused to travel around the circle of said tube of glass, cutting through the wall thereof and severing said tube from the mass of glass contained in the receptacle 2.

While the cutter 63 is describing a circle in the above operation it passes over the inclined face of spring-actuated pin 57, depressing said pin until said cutter has passed over it, when said pin rises again to prevent said cutter from rotating backward, when the operator reverses the movement of the cam to cause said cutter to retreat into the position shown in the dotted line in Fig. 2. The retreat of said cutter into said position again leaves a clear passage through orifice 14 for the next descent of the gatherer into the refining-ring. After the glass 77, attached to the gatherer 76, has, as above described, been severed from the glass contained in receptacle 2 tube 81 is withdrawn from inlet 80 by any suitable means and the glass detached from the gatherer 76, or both can be removed and another gatherer substituted, when the above operation of lowering the gatherer and drawing a cylinder of glass may be repeated. The gatherer is removed by disconnecting the air connection of pipe 15 and withdrawing tube 81, if such tube be used, and then lifting said gatherer up off the ends of vertical guides 18 and the central column composed of tubes 58 and 29, the handles 60 and 30 being made so as to sink into the tubes when at rest, as described, for that purpose, said tube 29 being supported on central support 6 and free at its upper extremity, so as to permit such removal of the gatherer.

When it is desired to prevent the severed lower portion of the glass from falling back into the receptacle and to afford means for continuing to draw the glass out of the receptacle without the use of the gatherer 76 after its initial gather, I operate the machine, preferably, as follows: As described initially for the last operation, all parts are in like position after the gatherer has reached its elevated position at the conclusion of the operation of drawing the cylinder of glass 77. Clamps 20 and 19 are now closed, handle 30 is raised to its horizontal position, as shown in Fig. 4, and rotated to the position shown in Fig. 3, causing the cams 33 to press outwardly on the projections 52 and 53 of clamps 44 and 45, respectively, forcing said clamps outwardly, together with the auxiliary clamps 40, 41, 42, and 43, until all of said clamps press tightly against the interior wall of the cylinder of glass 77, which is held firmly between the said inner clamps and outer clamp 19. Cutter 63 is now advanced into operative position and rotated, thus severing the cylinder 77 above the clamp 20. The gatherer and its pendent glass-cylinder 77 are now removed and the clamp 72 lowered into place in line with clamp 20, flanges 75 thereof passing over the end of the lower cylinder to interlock therewith by passing under the lugs 26 and into the recesses 27, said clamp 72 being locked in operative position at 74, after which the two hinged sections of the clamp 20 are tightened and locked together by means of lock 22, when a suitable tackle can be lowered and attached to said clamps 72 and 20. The lower set of clamps, comprised of inner clamps 44 and 45 and their auxiliary clamps 40, 41, 42, and 43, and the outer clamp 19 are loosened from the glass. The upper clamps 72 and 20 are now drawn upward by means of said tackle, thereby drawing a second cylinder of glass thereafter similar to cylinder 77 above described. When said second cylinder of glass has been drawn to the desired height, said lower clamps are again brought into operative position, so as to firmly grasp the walls of said cylinder of glass, when said cutter 63 is again brought into operative position and rotated, so as to sever the glass cylinder above said lower set of clamps, so that it can be removed. A new clamp 20 is now dropped into place around the exterior of the severed end of the glass below the plane of cutter 63, and another clamp 72 is dropped into position within the same. Clamps 20 and 72 are now tightened to gain a firm hold upon the glass and the lower clamps relaxed. By means of suitable tackle clamps 20 and 72 are raised as before, drawing a new cylinder of glass, as before described. It is readily seen that by providing a series of inner clamps 72 and outer clamps 20 this operation can be repeated indefinitely as long as glass in workable condition remains in receptacle 2. The inner clamp 72 could be covered and a cooling medium enter and escape for the purpose described in connection with the gatherer or the gatherer might be left unclosed at the top and a cooling medium circulated therein as the glass is drawn upward without departing from my invention.

By referring to Fig. 1 and assuming that the orifice 14 is unobstructed the gatherer 76, drawing glass from the receptacle 2, and a cooling fluid entering pipe 15, circulating through cooler 8, and discharging through a series of ports 13, located around the outer face of said cooler, the outlet 16 being closed, the results would be as follows: The temperature would be lowered in the orifice 14 outside of the tubular glass 77 by radiation from cooler 9, which it is assumed has no opening 13, but contains a current of cooling liquid, while the temperature in the orifice 14 inside of the tubular glass would be lowered by the direct contact of the cooling fluid passing from cooler 8 through ports 13. The cooling fluid would then pass upwardly through that portion of orifice 14 and fill the space within the wall of the cylinder of glass 77 and gatherer 76, thence escaping through openings 80 and 82, tube 81 being withdrawn from inlet 80 for that purpose. By this means the cooling fluid would be evenly distributed around the inner periphery of the glass cylinder 77. I may also dispense with a liquid-cooling medium and pass a cooling fluid through cooler 9 by closing the outlet-pipe 12 and utilizing a series of ports 13 in the inner face of said cooler, whereby the cooling fluid, entering pipe 11 and passing into cooler 9, passes through ports 13 and reduces the temperature in the portion of orifice 14 exterior to the tubular glass cylinder 77. Sufficient cooling fluid is in this case admitted to the interior of the cylinder of glass through the ports in the inner cooler, as described, or by means of the extensible tube 81 to keep the cylinder of glass from collapsing.

By inserting a refining-ring, as indicated at 3, of a double ring or, if desired, of a single ring, the inner ring being omitted, the quality of glass gathered will be superior to a gather as now made from a tank without the use of a refining-ring, insomuch as the impurities and scum which collect on the surface of the glass could not enter after the initial draw, which would contain more or less of said impurities and scum.

I also consider the supporting means for the structure thereabove novel, inasmuch as it may form a part of the receptacle and have openings therethrough similar to the ports 4 of refining-ring 3, in which case pipe 16 might pass up through tubular upright 29, being connected at the top by a flexible detachable coupling, which would also be required for inlet-pipe 15, provided both pipes are carried to the top of said upright. However, I can permit both pipes 15 and 16 to pass through the central column 6 without departing from my invention. The pipe 15, as shown in the drawings, passes down trough-tube 26 and passes through the central block 7, by which it is thus supported, and connects with the inner cooler 8.

By using means as shown in Fig. 6 for deflecting or baffling the current of cooling medium from a continuous uninterrupted flow around the interior of coolers 8 and 9 I gain an advantage not hitherto had, inasmuch as in the use of an uninterrupted passage in the coolers the tendency of the circulation is to keep the medium heated adjacent to the passage-way for the glass from the receptacle and to form an independent current of hot medium, while in my device the current passes from the front to the back alternately, thereby causing the liquid or fluid to become intermingled and of a uniform temperature, whereby the temperature at the orifice 14 is steady and uniform.

Although I have for the sake of clearness shown my machine as adapted for drawing cylindrical sheets of glass, it is evident that the same may be adapted for the production of sheets of oblong, oval, or any other inclosed cross-section. To effect this, I would vary accordingly the contour of the orifice 14 and the inclosing coolers, together with that of the gatherer and various clamps. The refining-ring would of course be modified in shape accordingly. In such cases I prefer to substitute the form of shearing device illustrated in Fig. 5, which, as explained, is operated on the same principles as illustrated in Figs. 3 and 4 in the case of the lower interior clamps 44 and 45 and their auxiliary clamps. It is evident that by a modification of the shapes of the component parts a cutting or clamping perimeter of oblong, oval, or similar shapes may be produced. An especial advantage attendant upon drawing sheets in an oval form exists in that such sheets may be cut vertically at the ends and thus expeditiously flattened.

If desired, a form of clamp preferably shown at 40, 41, 42, 43, 44, and 45 can be used for the glass as an inner bearing-surface for a cutting-knife or shearing device which presses inwardly against the exterior of the cylinder or hollow draw of glass 77. These means may be independent of the supporting means, such as 19 and 40, 41, 42, 43, 44, and 45, or the support 19 may be provided with a cutting means, preferably such as shown at 84, while the inner expandible member may present a plain bearing-surface to the glass 77, thus providing sufficient resistance to the exterior cutting means.

While I have gone into details as to the various ways in which I accomplish the different results described, other means will suggest themselves to those skilled in this art, and I do not desire to limit myself to the foregoing, but desire to include other modifications capable of arriving at the results which I claim to be new.

What I claim is—

1. In the art of manufacturing glass in cylindrical or other inclosed form, a receptacle adapted to contain glass in a workable condition, an opening in said receptacle, a support in said opening and a cooling-chamber surrounding the outer edge of said support.

2. In the art of manufacturing glass in cylindrical or other inclosed form, a receptacle adapted to contain glass in a workable condition, an opening in said receptacle, a support in said opening, a cooling-chamber surrounding said support and a second cooling-chamber, said second cooling-chamber being within said opening and spaced from the first cooling-chamber whereby an orifice is formed between the said cooling-chambers through which orifice glass is drawn from said receptacle.

3. In the art of manufacturing glass, a gatherer adapted to draw glass in cylindrical or other inclosed form, an opening in said gatherer, means for discharging a cooling fluid through said opening at substantially the lower exposed portion of said draw during substantially the entire operation of drawing the glass and means within the interior of the draw for supporting said first-mentioned means.

4. In the art of manufacturing glass, a receptacle adapted to contain glass in a workable condition, means for withdrawing a portion of said glass in cylindrical or other inclosed form, a cam, and means operated by said cam and located within the interior of said draw of glass for severing said withdrawn portion from the glass contained in said receptacle.

5. In the art of manufacturing glass, a receptacle adapted to contain glass in a workable condition, means for withdrawing a portion of said glass in cylindrical or other inclosed form, a cam, means operated by said cam and located within the interior of said draw of glass for severing said withdrawn portion from the glass contained in the receptacle and exterior means adapted to form a resistance against the outward pressure of said glass at the line of severance.

6. In the art of manufacturing glass, a receptacle adapted to contain glass in a workable condition, means for withdrawing a portion of said glass in cylindrical or other inclosed form, combined inner and outer means for supporting the lower portion of said withdrawn glass, means for severing the glass above said supporting means and secondary combined inner and outer means for withdrawing the glass supported by said supporting means.

7. In the art of manufacturing glass, a receptacle adapted to contain glass in a workable condition, means for withdrawing a portion of said glass in a cylindrical or other inclosed form, inner and outer means for supporting said withdrawn portion, means for severing the glass above the supporting means and secondary means for withdrawing the glass supported by said first supporting means.

8. In the art of manufacturing glass in cylindrical or other inclosed form, a receptacle adapted to contain glass in a workable condition, an orifice in said receptacle, inclosed inner and outer cooling-chambers adjacent to said orifice and openings in said cooling-chambers for the discharge of a cooling fluid.

9. In the art of manufacturing glass, a receptacle adapted to contain glass in a workable condition, an orifice in said receptacle, a cooler adjacent to said orifice, a gatherer adapted to draw glass in cylindrical or other inclosed form through said orifice, and means for discharging a cooling fluid from said cooler between the interior of the drawn glass and a portion of said orifice whereby said fluid forms an upward circulation in the interior of the drawn glass.

10. In the art of manufacturing glass in cylindrical or other inclosed form, a receptacle adapted to contain glass in a workable condition, an orifice in said receptacle, means for drawing glass from said receptacle and through said orifice, a support adjacent said orifice, a cooling-chamber surrounding said support and within the gather of glass of said drawing means.

11. In the art of manufacturing glass, a cam, a cutter adapted to sever tubular glass, said cutter being operated by said cam for the purpose of advancing said cutter forward into operative position, rotating and withdrawing the same for the purpose described.

12. In the art of manufacturing glass, supporting means for the lower severed end of cylindrical or other inclosed form of glass, said supporter being composed of an exterior member and of an interior expandible member.

13. In the art of manufacturing glass, adjustable means for supporting the lower severed end of a cylindrical or other inclosed draw of glass, consisting of an outer member adapted to bear against the exterior of said glass, and an interior member adapted to bear against the interior of said glass.

14. In the art of manufacturing glass, means for supporting the severed end of a draw of glass of tubular or other inclosed form, said means consisting of a member adapted to bear against the exterior of said draw of glass, and a second member adapted to bear against the interior of said draw of glass, consisting of a plurality of adjustable parts.

15. In the art of manufacturing glass, means for supporting the severed end of a draw of glass of tubular or other inclosed form, said means consisting of a member adapted to bear against the exterior of said draw of glass, and a second member adapted to bear against the interior of said draw of glass consisting of a plurality of adjustable parts and a cam to actuate said parts.

16. In the art of manufacturing glass, a sheet of glass in hollow form, a central means within said sheet carrying a secondary means both of which said means operate a series of third means adapted to bear against the inner surface of said glass, and an exterior means against which the exterior surface of said glass may bear, for the purposes described.

17. In the art of manufacturing glass, a central support, a gatherer adapted to reciprocate on said support, and means for rotating said central support.

18. In the art of manufacturing glass, a central support, a gatherer adapted to reciprocate upon said central support, means for rotating said central support and means whereby said gatherer may be removed from said central support without interfering with said rotating means.

Signed by me at Pittsburg, Pennsylvania, this 9th day of April, 1903.

GEORGE H. HARVEY.

Witnesses:
M. L. AVNER,
EMELINE RUTTER.